Figure 1:
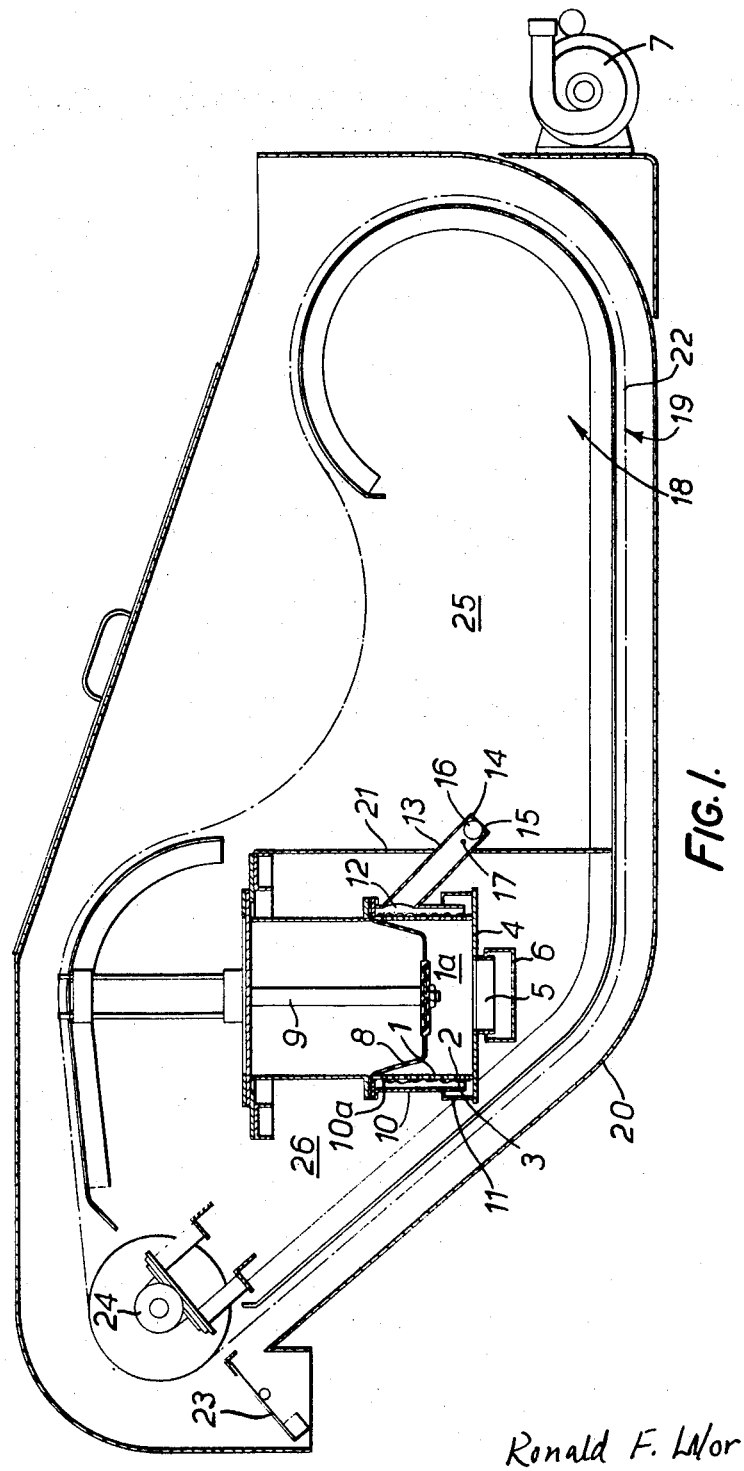

United States Patent [19]

Worlidge

[11] 3,767,049

[45] Oct. 23, 1973

[54] LIQUID CLEANSING MEANS

[76] Inventor: Ronald Frederick Worlidge, High Ridge, 9 Durlston Rd., Parkstone, Poole, Dorset, England

[22] Filed: Aug. 5, 1971

[21] Appl. No.: 169,340

[30] Foreign Application Priority Data
Aug. 11, 1970 Great Britain.................. 38,625/70

[52] U.S. Cl.................. 210/108, 210/298, 210/412
[51] Int. Cl........................................... B01d 29/38
[58] Field of Search................... 210/106, 108, 407, 210/412, 298

[56] References Cited
UNITED STATES PATENTS

| 2,338,418 | 1/1944 | Forrest et al. | 210/412 |
| 2,494,534 | 1/1950 | Armstrong et al. | 210/108 X |
| 1,626,591 | 5/1927 | Moses | 210/412 |
| 2,024,753 | 12/1935 | Zwican | 210/106 |
| 2,627,979 | 2/1953 | Lamb | 210/142 |

FOREIGN PATENTS OR APPLICATIONS

| 729,356 | 5/1973 | Great Britain | 210/412 |

Primary Examiner—John Adee
Attorney—Lawrence E. Laubscher et al.

[57] ABSTRACT

The invention comprehends a liquid cleansing apparatus comprising a filtration unit; said filtration unit comprising a filter means, a fluid flow path for liquid to be filtered through said filter means from a dirty to a clean side thereof, a liquid displacement means operable to backflush a specified volume of filtered liquid through said filter means from said clean to said dirty side thereof thereby to dislodge solid contaminant, filtered from said liquid, from said dirty side of said filter means, a contaminant receiving chamber defined adjacent said dirty side of said filter means and of a volume smaller than the specified volume of filtered liquid which said liquid displacement means is capable of backflushing, and valve means for discharging from said contaminant receiving chamber liquid backflushed by said liquid displacement means thereinto together with contaminant dislodged from said dirty side of said filter means by said backflushed liquid.

11 Claims, 4 Drawing Figures

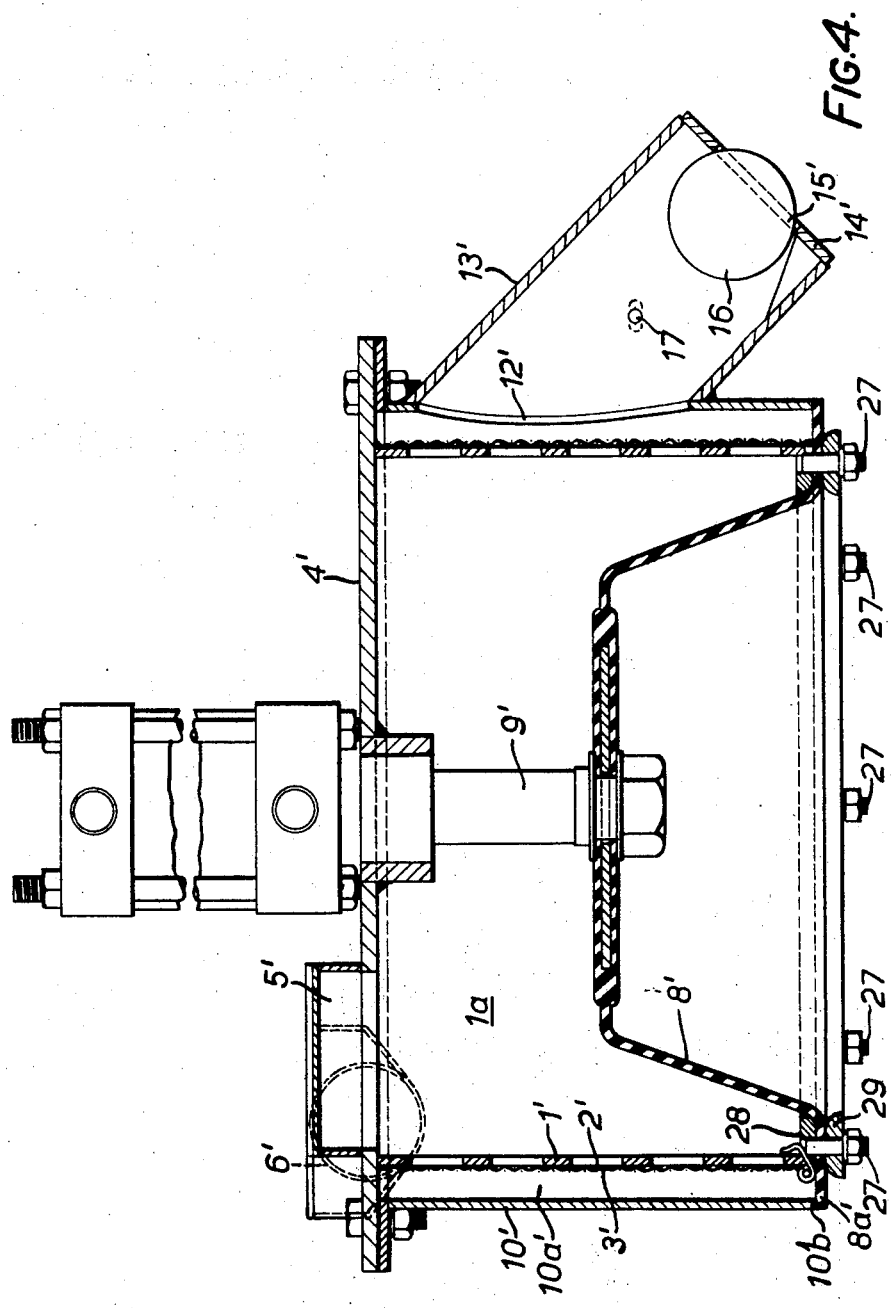

LIQUID CLEANSING MEANS

This invention is concerned with improvements in or relating to liquid cleansing apparatus, more particularly, but not exclusively, intended for the removal of metal particles such as grinding swarf and grinding wheel dust from the liquid commonly known as coolant used on grinding machines.

Present methods of cleansing the liquid commonly use paper or bloth as a filter media, some such machines move the paper or cloth through the filter so that when contaminated it is discharged into a waste bin automatically, others do not have a so-called disposable media but use the same media repeatedly; cleansing in such cases is carried out either automatically or manually. Automatic cleansing is confined principally to large machines for handling a large flow of coolant. Smaller machines are more commonly manual.

I have devised a cleansing apparatus which cleans the coolant using a permanent media and which is fully automatic in operation and in the small and less expensive range such that it is suitable to serve either a single machine or a small group of machines.

Figure 2:
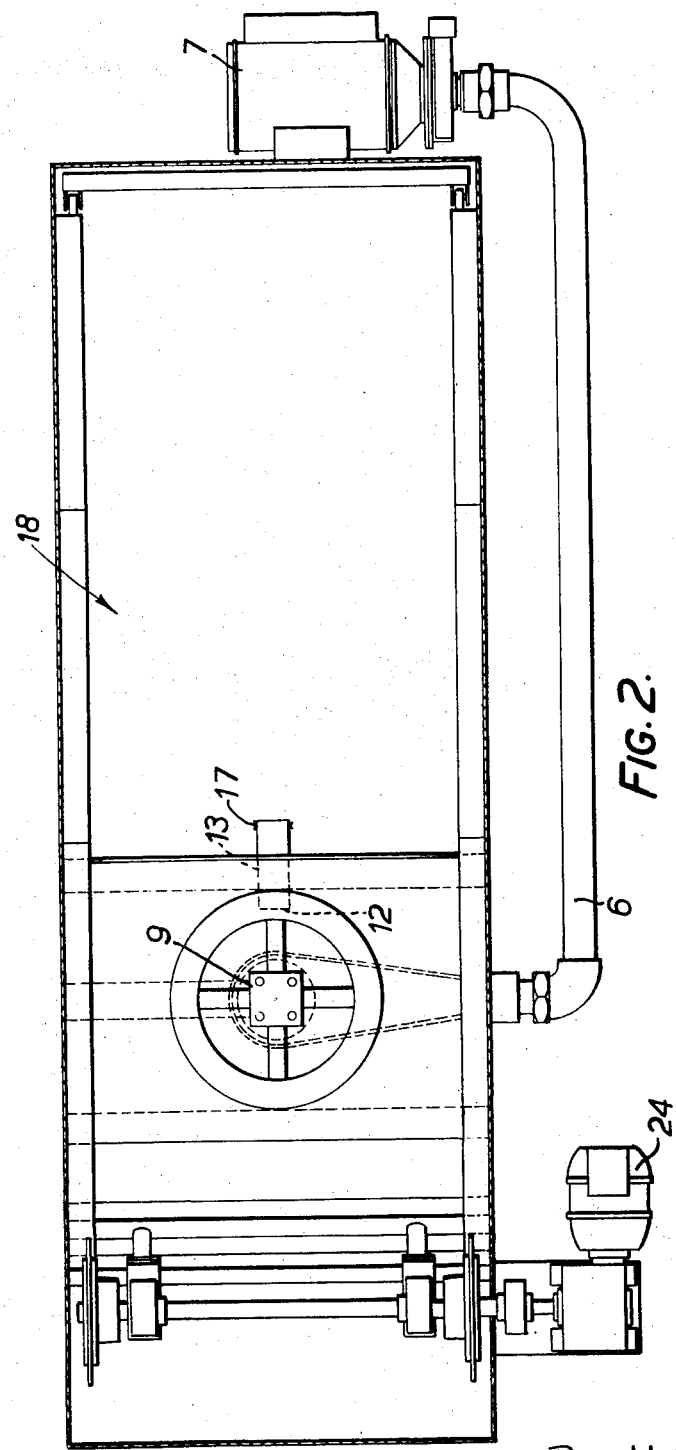
Figure 3:
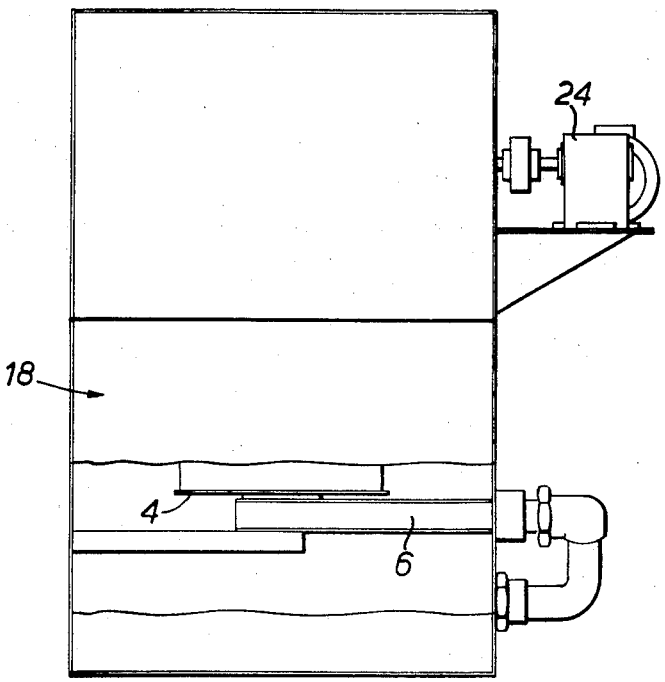

In order that the invention may be well understood there will now be described two embodiments thereof, given by way of example only, reference being had to the accompanying drawings, in which:

FIGS. 1, 2 and 3 are a part sectioned side elevation, plan view and part sectioned end elevation respectively of a liquid cleansing apparatus incorporating one form of filtration unit and embodiying the invention; and FIG. 4 is a part sectioned side elevation of an alternative and preferred filtration unit for the liquid cleansing apparatus depicted in FIGS. 1 to 3.

Like references in the various Figures denote like parts.

In the liquid cleansing apparatus, there is provided a filter means in the form of a filter element comprising a rigid cylindrical perforated member 1 covered on its outer cylindrical surface by a coarse woven screen 2 of metal or plastic which is in turn covered by a fine woven screen or filter media 3 preferably made of monofilament nylon or a similar suitable material. The cylinder 1 is closed at its lower end 4, the closure being provided with an aperture 5 and a connection for a pipe or tube 6 to convey liquid to the suction side of a suitable centrifugal or other pump 7. The opposite end of the cylinder is closed by a flexible diaphram 8 which has connected to its centre a means for moving the centre of the diaphragm through a linear motion such that when so moved the diaphragm will displace a specific volume of liquid. The moving means may conveniently be a pneumatically operated ram 9.

Around the cylindrical periphery of the cylinder 1 and spaced a small distance away from it there is provided a further cylinder 10 closed at its upper end and open at its lower end. That open end is itself closed by a tubular movable member 11 arranged so as to prevent the flow of liquid past the moving member to the filter media 3 but permitting flow in the opposite direction. An aperture 12 is provided in the cylinder 10, the aperture being the termination of a short tubular member 13 extending downwardly and outwardly of the cylinder 10, the opposite extremity of which member 13 is a disc 14 partially closing it, the disc having a hole 15 at its centre smaller than the internal diameter of the tube 13.

A ball 16 of rubber or other suitable material is located within the tube 13, means for example a split pin 17, being provided for preventing the ball travelling more than a limited distance along the tube, so that liquid flow in one direction towards the filter media 3 may pass through the aforesaid hole 15 and pass the ball whilst liquid flow in the opposite direction will cause the ball to seat and seal off the hole as a non-return valve.

The above described apparatus forms a filtration unit which is mounted in a small conventional drag tank 18, that is to say, a tank fitted with a drag chain conveyor 19 having at one end a sloping surface 20 so that the conveyor will drag solids which settle to the bottom of the tank up the sloping surface and discharge them from the tank at the upper limit of the sloping surface.

A baffle plate 21 is provided across the drag tank, the upper edge of the baffle plate terminating above the level of the liquid in the tank, the lower edge being close to the bottom of the tank but still permitting the chain 22 and flight bars 23 of the drag conveyor to pass under it. The baffle 21 is so positioned that it divides the tank effectively into two compartments 25 and 26, the relative capacity of which perform a function which will be apparent from the description of operation given hereafter.

The drag conveyor 19 itself is driven by any convenient means such as a small electric geared motor unit 24. The air cylinder of the pneumatic ram 9 is caused to make its stroke upwards and downwards by an electro-magnetic air valve (not shown) which is itself controlled by a suitable timer or vacuum switch (not shown) or both operating again as described hereafter.

It will be seen from the foregoing that the filtration unit mounted in the tank 18 is effectively a filter in the suction pipe 6 from the tank to the pump 7. Therefore, any liquid reaching the pump will have had the solids removed from it. The cleansing of the filter element is effected as follows:

At intervals the aforesaid timing device or vacuum switch will operate the pneumatic valve causing the air cylinder to move so as to displace the disphragm 8 upwards, this operation taking place relatively slowly. At the completion of its movement the air valve will again operate to cause the air cylinder, and therefore the diaphragm 8, to move rapidly downwards thus displacing filtered liquid from the chamber 1a defined by and within the perforated cylinder 1 having the filter media 3 on its outer surface. The displacement of liquid is so rapid that only a part, for example 25 percent, can be forced to the pump 7 in addition to the normal flow taken by the pump since the pipe 6 between the filter element and the pump suction is sized so as to present a restriction to a relatively high flow whilst not presenting an effective restriction to the normal flow of the pump.

It will be seen, therefore, that the greater proportion of the liquid displaced by the diaphragm 8 from its rapid downward stroke cannot pass to the pump 7 and must, therefore, be forced through the filter media 3 in a direction opposite to that of normal flow to the pump, thus performing a backflush operation.

Since the chamber 10a between the filter screen 3 and the outer cylinder member 10 is of limited volume and smaller than that of the backflushed liquid, the backflushed liquid must again find a further outlet. A reversal of flow in the normal entry to the filter element will cause the ball type non-return valve 16 to seat and prevent flow through this exit. The liquid and contaminant removed from the filter element must, therefore take the only remaining path which is past the lower end of the tubular movable member 11 surrounding the filter element and serving as a one-way valve. Thus, it will be seen that the backflushed liquid containing contaminant removed from the filter media is effectively ejected from the space immediately surrounding the filter element and is effectively prevented from returning to that space. It will further be seen that the above-described method of cleaning takes place without interrupting the flow of liquid to the pump or to the machine being served by the cleansing apparatus. It is also evident that the average volume of liquid displaced by backflushing can be small relative to the flow to the pump and that the intervals between cleaning operations may be varied according to the time interval of the aforementioned timing device which may be a standard time clock or other conventional electro-pneumatic device.

The apparatus is so arranged that the flow of contaminated liquid returning from the machine enters that compartment 25 of the tank 18 opposite from the drag out end. Some of the contamination will settle by gravity and be removed by the drag conveyor 19. The entry pipe 13 of the filter apparatus containing the ball valve 16 is in communication with the compartment 25 of the tank whilst the liquid discharged through backflush is constrained to enter that compartment 26 of the tank on the opposite side of the aforementioned baffle 21 nearest to the drag out end.

Since backflush cleasing involves the displacement of a relatively small volume of liquid, and since it only takes place at infrequent intervals, say once every three minutes or more, and since the backflush operation is completed in a very short time, say one second, it will be seen that the average flow into the drag out compartment 26 of the tank is very small and the tank itself is so dimensioned that in this section between the baffle and drag out end the volume of liquid is not less than 20 times the average flow per minute of the backflushed liquid, that is to say, the contamination will have approximately 20 minutes in which to settle on to the drag conveyor and be removed. For instance, if the displacement of the diaphragm 8 is say 1 gallon and backflushing takes place every 3 minutes, the average flow is one-third gallon per minute and the capacity necessary to provide 20 minutes settling time is approximately 7 gallons.

The compartment 25 of the tank 18 on the opposite side of the baffle 21 is so dimensioned that the total flow of liquid returning from the machine will have a residence time in this section of the tank of not less than 3 minutes which is sufficient for the heavier particles to settle by gravity so that only the finer particles pass to the filter. For instance, if the flow required by the machine and supplied by the pump is 20 g.p.m. this section of the tank would require a capacity of 60 gallons.

The drag conveyor 19 may be arranged to move continuously or may be arranged to move in short steps such moving taking place only during the complete backflush cycle, which allowing for the slow upward movement of the cylinder and the rapid downward movement may take 3 or 4 seconds.

The alternative and preferred filtration unit illustrated in FIG. 4 is generally similar to that already described and is located in similar fashion in the drag tank to perform the same function. However, the unit is improved in certain respects.

Thus, the cylinder 1' is closed at its upper end 4, and the lower end of the cylinder is closed by the flexible diaphragm 8' which is raised by the pneumatically operated ram 9' to backflush filtered liquid through the filter element 1' and into the chamber 10a' with the contaminant dislodged from the dirty side of the element. In this construction, it is the outer peripheral edge 8a' of the diaphragm 8' which acts as the one-way valve, that edge normally seating against the lower edge 10b' of the cylinder 10' but being resiliently displaceable therefrom when subjected to the force of backflushed liquid urged into the chamber 10a' to permit such liquid and dislodged contaminant which it contains to discharge into the drag tank compartment 26, as before. Since the suction pump 7' will create a depression (i.e., pressure reduction) in the chamber 1a' and hence the chamber 10a' in communication therewith, it promotes engagement of the diaphragm edge 8a' with its seat 10b', although, as stated, such seating will be broken during a backflushing operation. The diaphragm 8' is secured to the lower edge of the filter element 1' by cooperating screw threaded fasteners 27 acting to clamp the diaphragm between an upper collar 28 welded to the filter element and a lower collar 29.

I claim:
1. Liquid filtration apparatus, comprising
  a. hollow filter means (2, 3) defining a filtrate chamber (1a);
  b. means (13) for supplying contaminated fluid for filtered passage through said filter means in the direction of said filtrate chamber;
  c. means (5, 6) for withdrawing filtered fluid from said filtrate chamber;
  d. means defining adjacent the input side of said filter means a contaminate chamber (10a);
  e. normally-closed pressure-responsive one-way discharge valve means (11, 8a) operable to discharge fluid from said contaminate chamber; and
  f. backflush diaphragm means (8) for reducing the volume of said filtrate chamber an amount sufficient to backflush from said filtrate chamber to said contaminate chamber through said filter means a quantity of backflushed fluid the voluem of which is greater than that of said contaminate chamber, whereby said discharge valve means is opened by the pressure of said backflushed fluid to discharge from said contaminate chamber both the backflushed fluid and the solid contaminates remove by backflushing from said filter means.

2. Apparatus as defined in claim 1, and further comprising piston motor means including a ram (9) for operating said diaphragm means, said piston motor means causing said ram to have a relatively rapid stroke in the direction effecting a reduction in the volume of said filtrate chamber, and a relatively slow stroke in the opposite direction.

3. Apparatus as defined in claim 1, wherein said filter means comprises a cylindrical filter element defining therein said filtrate chamber; wherein the flow of contaminated fluid to said filtrate chamber is radially inwardly through said cylindrical filter element, said diaphragm means being mounted adjacent one end of said filter element to vary the volume of said filtrate chamber; and further wherein said means for withdrawing filtered fluid from said filtrate chamber includes means operable during the backflushing operation of said diaphragm means for restricting the increased flow of filtered fluid produced by said diaphragm means, thereby to effect a radially-outwardly backflushing flow of filtered fluid through said filter means.

4. Apparatus as defined in claim 3, wherein said means defining said contaminate chamber comprises a tubular wall member (10) arranged in concentrically spaced relation about said filter element; and further wherein said diaphragm means comprises a flexible diaphragm element connected with one end of said filter element, said diaphragm element including a peripheral edge portion (8a) that extends radially outwardly beyond said filter element for cooperation with a corresponding end of said tubular wall member to define said discharge valve means.

5. Apparatus as defined in claim 4, wherein said filter element is arranged with its axis extending vertically; and further wherein said diaphragm element is connected with the lower edge of said filter element, said peripheral edge portion of said diaphragm element cooperating with the lower edge of said tubular wall member to define said discharge valve means.

6. Apparatus as defined in claim 5, wherein said fluid supply means includes a suction pump operable to create a pressure drop within said contaminate receiving chamber to promote engagement of the outer peripheral edge portion of said diaphragm element with said tubular member.

7. Apparatus as defined in claim 1, wherein fluid supply means includes a supply conduit connected at one end with said contaminate chamber for supplying fluid to said filtrate chamber via said contaminate chamber and said filter means, and pressure-responsive inlet valve means for closing said supply conduit during the backflushing operation to prevent backflushed liquid from escaping from said contaminate chamber via said supply conduit.

8. Apparatus as defined in claim 7, wherein said conduit means extends downwardly from and outwardly of said contaminate chamber, said conduit means including a transverse wall containing an aperture; and further wherein said inlet valve means comprises a ball seatable in said aperture, and stop means spaced from said transverse wall for permitting said ball to be freed from its seat for limited travel up said conduit.

9. Apparatus as defined in claim 6, and further including a drag tank for receiving the fluid discharged from said contaminate chamber, said drag tank having at one end an upwardly inclined surface, drag chain conveyor means for dragging the solid contaminate that settled on the bottom of said drag tank up said inclined surface for discharge from said tank, and baffle plate means dividing said drag tank into a pair of compartments, said filter means being arranged in a first one of said compartments defined adjacent said inclined surface, said fluid supply means being connected with the other drag tank compartment for supplying to said filter means contaminated fluid from which the solid contaminate has not settled, said discharge valve means being operable to discharge the backflushed liquid and the solid contaminates dislodged thereby into said first compartment, whereby the solid contaminate will settle into said drag chain conveyor means.

10. A liquid cleansing apparatus according to claim 9, wherein the capacity of said first and second compartments relative to the rate of flow of liquid thereinto is such that the settling time in said first compartment is substantially greater than that in said second compartment.

11. Liquid filtration apparatus, comprising
 a. hollow filter means defining a filtrate chamber;
 b. means for establishing a flow of contaminated fluid through said filter means, comprising means including pressure-responsive normally-open inlet valve means for supplying contaminated fluid for passage to said filtrate chamber via said filter means, and means for continuously withdrawing filtered fluid at a normal flow rate from said filtration chamber, said fluid withdrawal means defining a restriction to fluid flow when the fluid pressure of said filtrate chamber increases above a given value;
 c. means defining adjacent the supply side of said filter means a contaminate chamber;
 d. normally-closed pressure-responsive discharge valve means for discharging fluid from said contaminate chamber when the pressure thereof exceeds a given value; and
 e. backflush diaphragm means for periodically reducing the volume of said filtrate chamber an amount sufficient to backflush from said filtrate chamber through said filter means a quantity of backflushed fluid the voluem of which is greater than that of said contaminate chamber, whereby upon each operation of the diaphragm valve means, the increase in pressure in said filtrate chamber produced by the restriction in said fluid withdrawal means by the backflushed fluid and are discharged therewith through said discharge valve means.

* * * * *